(12) United States Patent
Hurt et al.

(10) Patent No.: US 7,121,407 B2
(45) Date of Patent: Oct. 17, 2006

(54) UTILITY CASE

(75) Inventors: Thomas Hurt, Elgin, IL (US); John J. Hagemann, Plano, IL (US)

(73) Assignee: Plano Molding Company, Plano, IL (US)

( * ) Notice: Subject to any disclaimer, the term of this patent is extended or adjusted under 35 U.S.C. 154(b) by 229 days.

(21) Appl. No.: 10/657,882

(22) Filed: Sep. 8, 2003

(65) Prior Publication Data
US 2005/0051444 A1   Mar. 10, 2005

(51) Int. Cl.
B65D 85/28 (2006.01)
(52) U.S. Cl. .................. 206/373; 220/530; 220/533
(58) Field of Classification Search ............. 206/561, 206/372, 373, 349; 220/529, 530, 532, 533, 220/551, 552
See application file for complete search history.

(56) References Cited

U.S. PATENT DOCUMENTS

| 4,446,966 | A | * | 5/1984 | Moloney | 206/708 |
| 4,838,445 | A | * | 6/1989 | Lanius | 220/533 |
| 4,889,254 | A | | 12/1989 | Vola | |
| 5,054,668 | A | * | 10/1991 | Ricchiuti | 224/42.33 |
| 5,390,815 | A | * | 2/1995 | Spiegel | 220/529 |
| 5,427,446 | A | * | 6/1995 | Glomski | 312/242 |
| 5,433,336 | A | * | 7/1995 | Kristoffersson | 220/531 |
| 5,553,710 | A | * | 9/1996 | Takama | 206/561 |
| 5,826,956 | A | * | 10/1998 | Norton | 312/183 |
| 6,213,296 | B1 | | 4/2001 | Streich et al. | |
| 6,279,744 | B1 | * | 8/2001 | Yu | 206/372 |
| 6,405,864 | B1 | | 6/2002 | Streich et al. | |
| 6,516,948 | B1 | * | 2/2003 | Caballero | 206/373 |

FOREIGN PATENT DOCUMENTS

| JP | 3-31721 | 7/1991 |
| JP | 3069109 | 3/2000 |

* cited by examiner

Primary Examiner—Shian T. Luong
(74) Attorney, Agent, or Firm—Vedder, Price, Kaufman & Kammholz, P.C.

(57) ABSTRACT

An organizer case comprising a tray having a bottom wall and a plurality of compartment walls formed unitarily with and upstanding from said bottom wall, at least two of said walls extending in parallel relation and spaced apart a separation distance, said two of said walls having confronting sidewall faces each having a plurality of first joint formers spaced therealong, a first set of insert dividers each dimensioned to extend non-orthogonally between said sidewall faces, a second set of insert dividers each dimensioned to extend orthogonally between said sidewall faces, the dividers of each said set each having opposed side edge flange portions having second joint formers for friction fit engagement with said first joint formers, said side edge flange portions of each of the dividers of said first set being spaced apart a distance at least about 20% greater than said separation distance.

5 Claims, 5 Drawing Sheets

US 7,121,407 B2

UTILITY CASE

BACKGROUND OF THE INVENTION

The present invention relates to organizer cases and, more particularly, to cases for organizing small fishing tackle and related items.

Plano Molding Company has long produced a line of small injection molded plastic organizer cases for fishing tackle such as lures, hooks, sinkers and the like. These cases range in size from 8.25 in. (L)×4.25 in. (W)×1.38 in. (H) to 14 in. (L)×9.13 in. (W)×2 in. (H) and have been produced with divider inserts so that the user may tailor individual compartment size to the particular array of items to be stored in the case. To this end, the cases are produced with a number of walls formed unitarily with the case. The walls are provided with a series of joint formers (dovetail grooves or recesses) that are spaced therealong. The inserts have side edge portions with cooperating joint formers (dovetail tenons).

The foregoing Plano cases and competitive cases are designed to permit the user to configure a large number of variously sized (or like sized) compartments of rectangular configuration.

One limitation of cases heretofore offered has been the fact that the insert dividers can be used only to make rectangularly shaped individual compartments. Another limitation has been that very small items such as hooks, monofilament line and the like can migrate between compartments by sliding under or over the insert dividers.

The object of the present invention is to overcome the foregoing limitations inherent in the prior art.

SUMMARY OF THE INVENTION

In accordance with one aspect of the invention, an organizer case is provided that includes a tray, a cover and an insert divider. The tray has a bottom wall and a plurality of compartment walls formed unitarily with and upstanding from said bottom wall. The compartment walls include a front tray wall, a rear tray wall, a pair of tray end walls, and a plurality of interior tray walls. Each of the compartment walls has an upper free edge. At least two of the compartment walls extend in parallel relation, are spaced apart a separation distance, and have confronting sidewall faces each having a plurality of joint formers, preferably dovetail grooves, spaced therealong extending in perpendicular relation to bottom wall. The insert divider includes a generally rectangularly shaped panel having peripheral T-flange shaped upper, lower and opposed first and second side panel edge portions. The first of the side panel edge portions has a joint former, preferably a dovetail tenon, projecting therefrom for engagement with a selected one of the dovetail grooves of a selected one of the sidewall faces. The second of the side panel edge portions also has a dovetail tenon projecting therefrom for engagement with one of the dovetail grooves of the other of the sidewall faces. The upper panel edge portion of the insert divider projects slightly above the upper free edge of at least one of the two of the compartment walls. The cover has a lower surface facing the tray when disposed in covering relation to the tray, and is provided with an elongated rib projecting from the lid lower surface to extend along the upper free edge of the aforesaid one of the compartment walls when the cover is closed. The peripheral flange edge portions of the insert divider abut the sidewall faces, the bottom wall and the lower surface of the cover when inserted between the opposed sidewall faces and the cover when inserted between the opposed sidewall faces and the cover is closed.

In accordance with another aspect of the invention, the width of the insert divider is greater than the spacing between the above noted opposing sidewall faces, that is, the flange edge portions are spaced apart a distance greater than the above noted separation distance.

In a preferred embodiment, the insert divider intercepts the planes of the aforesaid two walls at an angle of approximately 45 degrees when it is positioned therebetween with the dovetail tenons engaged with the dovetail grooves.

In accordance with still another aspect of the invention, an organizer case tray has a bottom wall and a plurality of compartment walls formed unitarily with and upstanding from the bottom wall. At least two of the walls extend in parallel relation and spaced apart a separation distance. The two walls have confronting sidewall faces each having a plurality of first joint formers spaced therealong. A first set of insert dividers are each dimensioned to extend non-orthogonally between the sidewall faces. A second set of insert dividers are each dimensioned to extend orthogonally between the sidewall faces. The dividers of each set each have opposed side edge flange portions having second joint formers for engagement with said first joint formers. The side edge flange portions of each of the dividers of the first set are being spaced apart a distance at least about 20% greater than the separation distance between the two walls.

BRIEF DESCRIPTION OF THE DRAWINGS

The invention may be best understood by reference following the description taking in conjunction with the accompanying drawings, and the several figures of which like reference numerals identify like elements.

DETAILED DESCRIPTION OF THE PRESENTLY PREFERRED EMBODIMENT OF THE INVENTION

Figure 1:
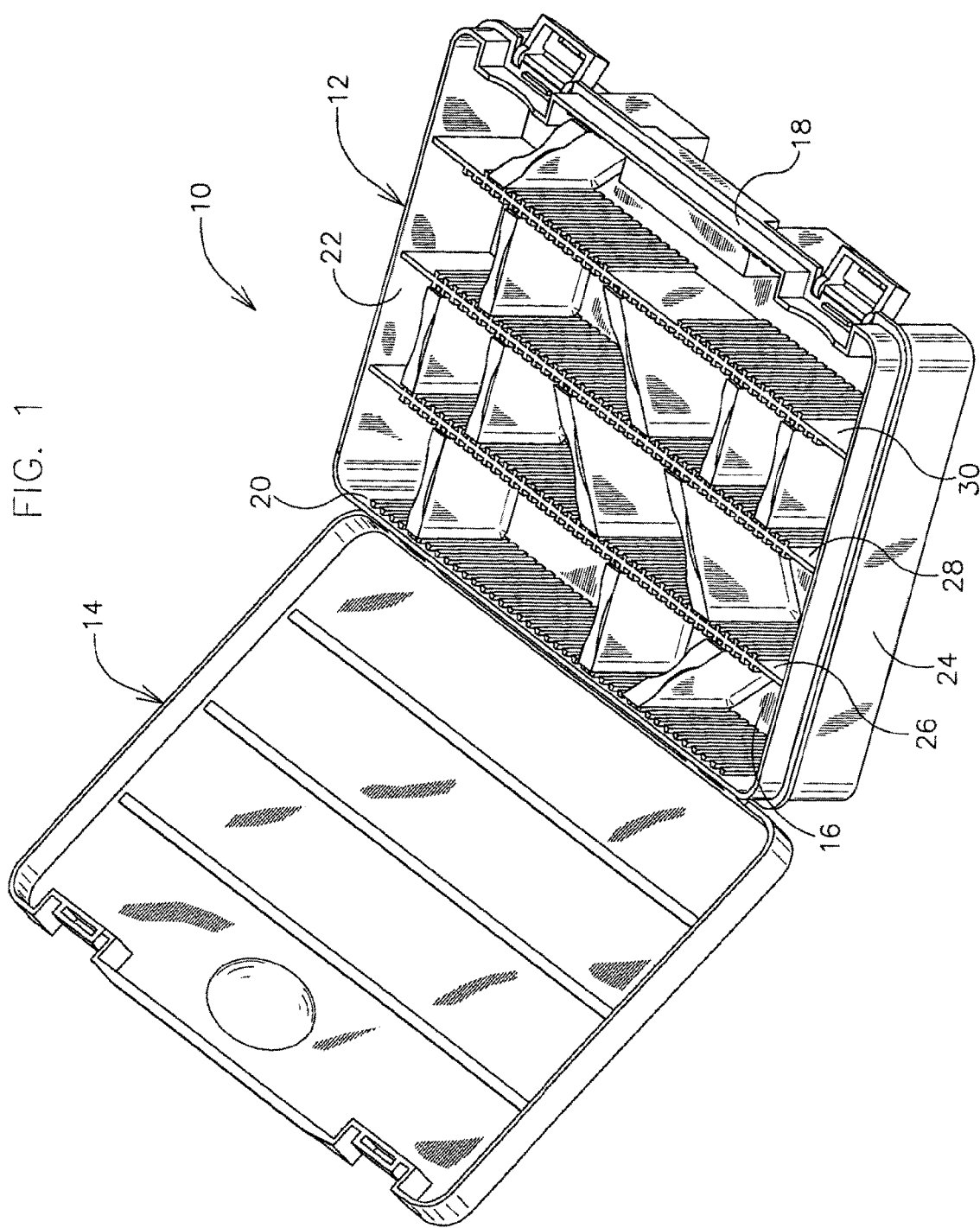
FIG. 1 is a perspective view of a utility case in accordance with the present invention.

With reference to the drawings, the present invention is shown for purposes of illustrative disclosure embodied in an organizer case 10 comprising a plastic case tray 12 and a plastic case lid or cover 14 that is connected to the tray by hinges of conventional design (not shown). Latches 16 and 18 secure the cover 14 to the tray 12 in a closed position.

The tray 12 includes a bottom wall 16. Formed unitarily with and upstanding from the bottom wall 16 are a plurality of compartment walls including a front wall 18, a rear wall 20, opposed side walls 22 and 24, and three interior walls 26, 28 and 30.

In the presently preferred form illustrated herein, the three interior walls 26, 28 and 30 all extend between side walls 22 and 24 in spaced parallel relation with respect to the front wall 18 and rear wall 20 and with respect to each other. In the illustrated embodiment, the spacing S between adjacent of the compartment walls 18, 20, 26, 28 and 30 is uniform. The walls have sidewall faces 32, 34, 36, 38, 40, 42, 44 and 46 with sidewall faces 32 and 34 being in opposed confronting relation as are faces 36 and 38, 40 and 42, and 44 and 46. Each of the sidewall faces has a plurality of first joint formers comprising dovetail grooves 48 spaced therealong with the grooves 48 extending in perpendicular relation to the bottom wall 16.

In order to permit the user to customize compartmentalization of the case tray 12, a first set of insert dividers 49 and a second set of insert dividers 50 are provided. Each of the insert dividers 49 and 50 comprises a generally planar insert panel wall 52 having a terminating upper edge flange 54, a terminating lower edge flange 56, and opposed terminating side edge flange 58 and 60 that merge with the upper and lower flange 54, 56 to provide a continuous flange about the insert panel wall 52.

Figure 2:
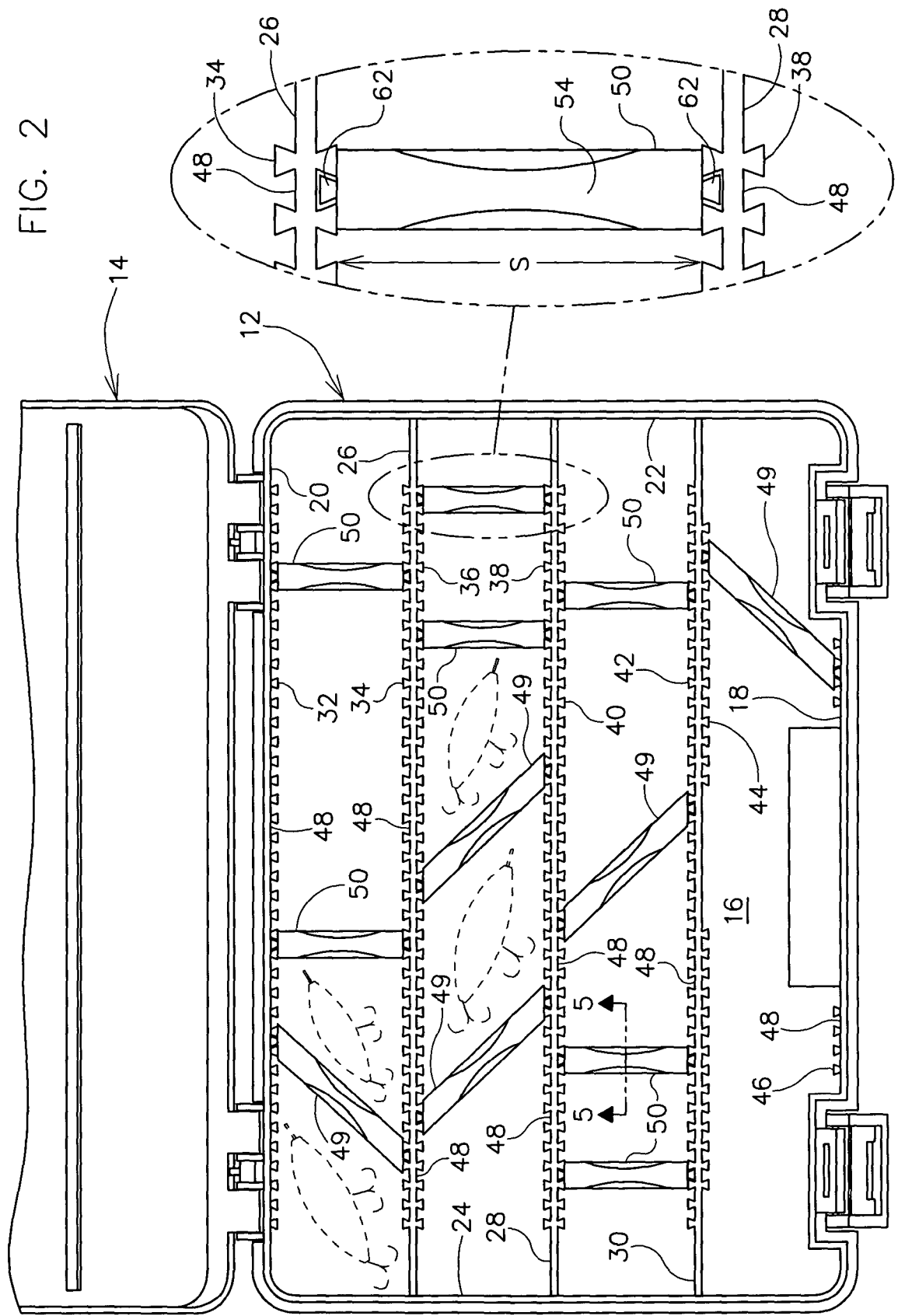
FIG. 2 is a top plan view of the case with the lid open, the lid being partially cut away, and with an enlarged top plan view of a portion thereof as indicated in oval phantom lines.
Figure 3:
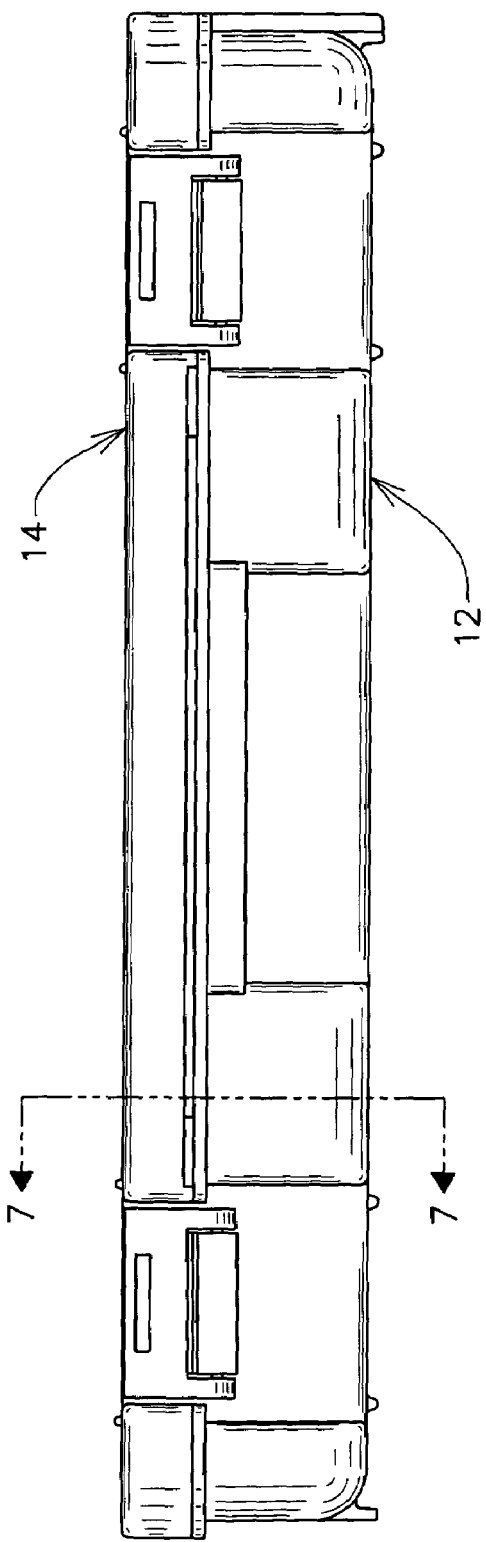
FIG. 3 is a front elevational view of the case of FIGS. 1 and 2.
Figure 4:
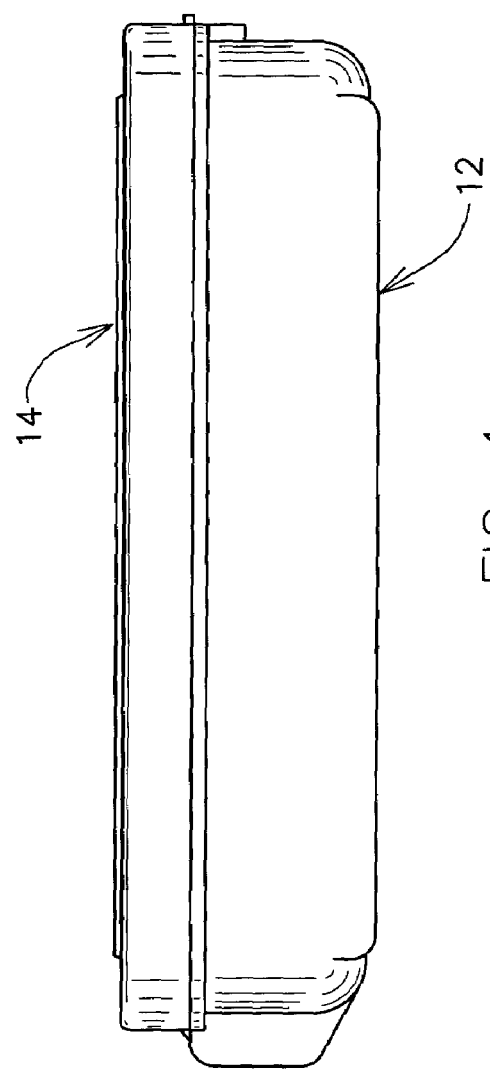
FIG. 4 is an end elevational view of the case of FIG. 3.
Figure 5:
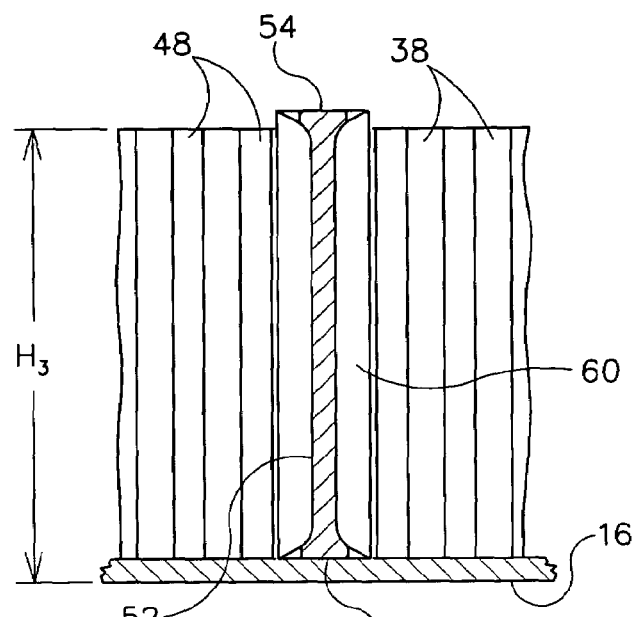
FIG. 5 is a sectional view taken, as indicated, along the lines 5—5 of FIG. 2.
Figure 6:
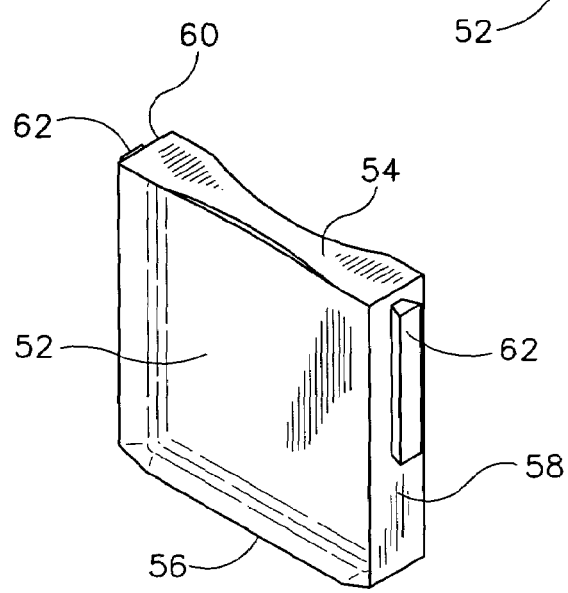
FIG. 6 is a perspective view of an insert divider in accordance with the present invention.
Figure 7:
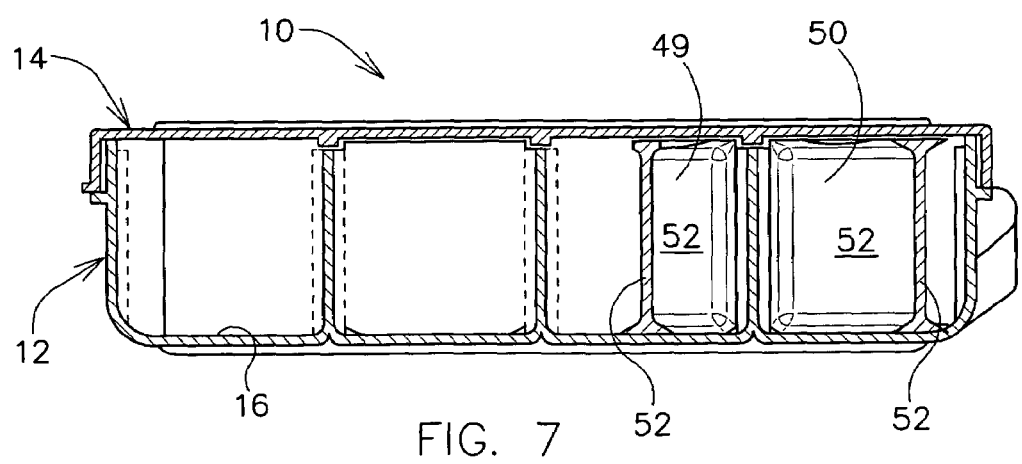
FIG. 7 is a sectional view taken, as indicated, along the lines 7—7 of FIG. 3.

As best shown in FIGS. 2A and 6, the opposed side flange 58, 60 each have a second joint former comprising a dovetail tenon 62 sized for cooperative snug-fit engagement with selected ones of the dovetail grooves 48 residing along selected of the opposed sidewall faces 32, 34 or 36, 38 or 40, 42 or 44, 46. In FIG. 2a, the surfaces of tenons 62 are shown spaced from the walls of grooves 48 for purposes of clarity of depiction only.

The height $H_1$ of the insert dividers 49 and 50 is equal to the height $H_2$ of the compartment walls 18, 20, 22, and 24 above the bottom wall 16, and slightly greater than the height $H_3$ of compartment walls 26, 28 and 30. The width $W_1$ of the second set of insert dividers 50 is equal to the separation spacing S while the width $W_2$ of the first set of insert dividers 49 is greater than the separation spacing S. Thus, each of the first set of insert dividers 49, when positioned between confronting sidewall faces, e.g. faces 32 and 34, with the dovetail tenons 62 in snug-fit engagement with dovetail grooves 48, extends therebetween at an angle $\alpha$. In the illustrated embodiment, the angle $\alpha$ is 45 degrees. As illustrated and as apparent, each insert divider 50 of the second set, when positioned, extends orthogonally between confronting sidewall faces.

Figure 8:
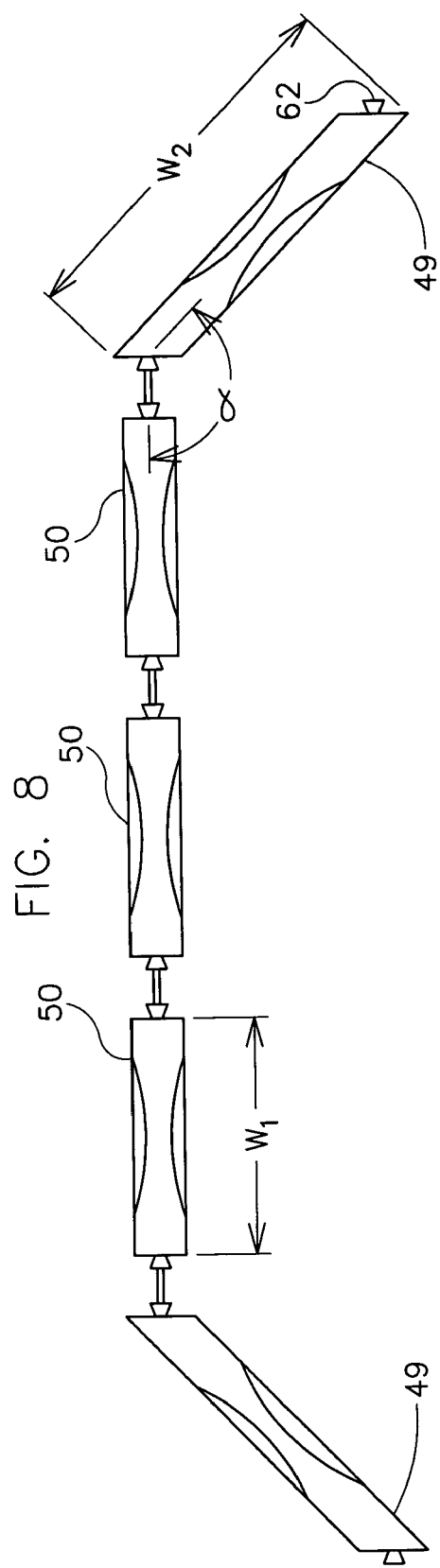
FIG. 8 is top plan view of an insert divider chain as molded.
Figure 9:
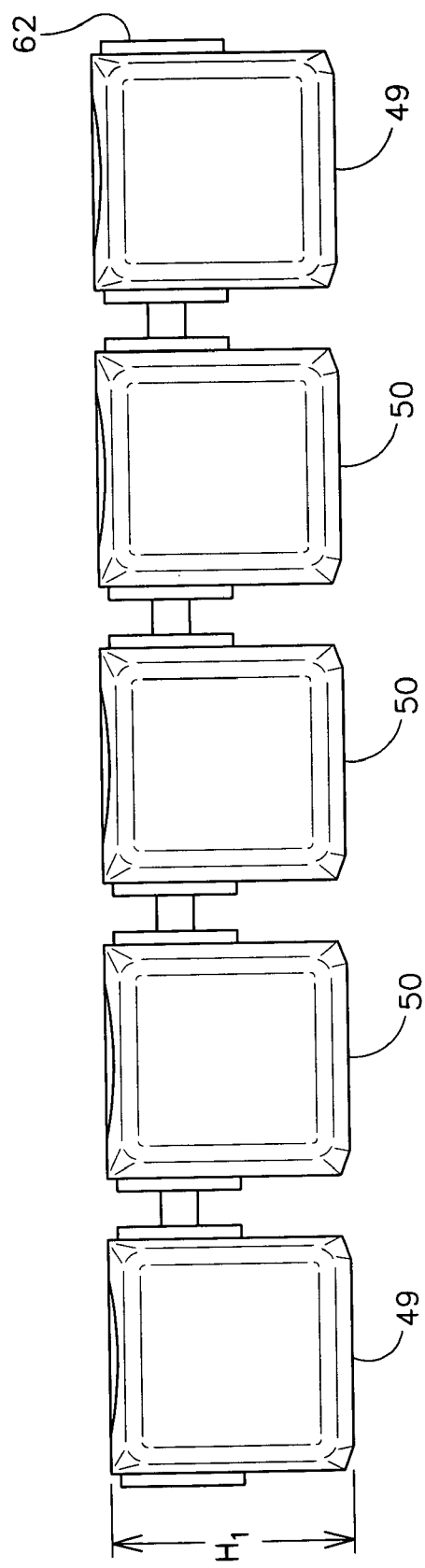
FIG. 9 is a front elevational view of the insert divider chain of FIG. 8.

With reference to FIGS. 8 and 9 the dividers 49 and 50 are formed by injection molding in a linked series. Because the side edge flange 58 and 60 of dividers 49 are angled at 45 degrees relative to the plane of the divider panel wall 52 and the tenons 62 extend in normal reltion therewith, tooling is used having cavities disposed at an angle $\alpha$ equal to 45 degrees in the illustrated embodiment for adjacent of dividers 49 and 50. Such facilitates ejection of the linked parts from the tool.

While the preferred embodiments of the invention have been shown and described, it will be apparent to those skilled in the art that changes and modifications may be made therein without departing from the spirit of the invention, the scope of which is defined by the appended claims.

What is claimed is:

1. An organizer case comprising a tray, a cover and an insert divider, said tray having a bottom wall and a plurality of compartment walls formed unitarily with and upstanding from said bottom wall, said compartment walls including a front tray wall, a rear tray wall, a pair of end tray walls, and a plurality of interior tray walls, each of said compartment walls having an upper free edge, two of said compartment walls extending in parallel relation and spaced apart a separation distance, said two of said compartment walls having confronting sidewall faces each having a plurality of dovetail grooves spaced therealong, said grooves extending in perpendicular relation to said bottom wall, said insert divider including a generally rectangularly shaped panel having peripheral flange shaped upper, lower and opposed first and second side panel edge portions, said first of said side panel edge portions having a dovetail tenon projecting therefrom for engagement with one of said dovetail grooves of one of said sidewall faces, the second of said side panel edge portions having a dovetail tenon projecting therefrom for engagement with one said dovetail grooves of the other of said sidewall faces, the upper panel edge portion of said insert divider projecting slightly above the free edge of at least one of said two of said compartment panels, said cover having a lower surface facing said tray when disposed in covering relation to the tray, said lower surface having an elongated rib to extend along the upper free edge of said at least one of said two of said compartment panels when said cover is closed, said panel edge portions abutting said sidewall faces, said bottom wall and said lower surface of said cover when said cover is closed.

2. An organizer case in accordance with claim 1 wherein said side panel edge portions are spaced apart a distance greater than said separation distance.

3. An organizer case in accordance with claim 2 wherein said side edge flange portions abut said sidewall faces and the lower flange portion abuts said bottom wall when said insert divider is positioned with said first joint formers in engaged relation with said second joint formers.

4. An organizer case in accordance with claim 3 and further including a lid for covering said tray, the upper flange portion abutting said lid when the lid is disposed in covering relation with said tray.

5. An organizer case in accordance with claim 4 wherein the first joint formers comprise dovetail grooves and wherein the second joint formers comprise dovetail tenons.

* * * * *